United States Patent
Kadar et al.

(10) Patent No.: US 7,760,684 B2
(45) Date of Patent: Jul. 20, 2010

(54) MEASURING MEDIA DISTRIBUTION AND IMPACT IN A MOBILE COMMUNICATION NETWORK

(75) Inventors: Vincent Kadar, Kanata (CA); Kevin Wiant, Charlestown, MA (US)

(73) Assignee: Airwide Solutions, Inc., Katana (CA)

( * ) Notice: Subject to any disclaimer, the term of this patent is extended or adjusted under 35 U.S.C. 154(b) by 519 days.

(21) Appl. No.: 11/674,355

(22) Filed: Feb. 13, 2007

(65) Prior Publication Data

US 2007/0191040 A1    Aug. 16, 2007

Related U.S. Application Data

(60) Provisional application No. 60/772,526, filed on Feb. 13, 2006.

(51) Int. Cl.
*H04W 4/00* (2009.01)
(52) U.S. Cl. .................. 370/328; 370/338; 455/423; 455/414.1; 455/466
(58) Field of Classification Search .......... 455/466, 455/423, 414.1; 370/328, 338
See application file for complete search history.

(56) References Cited

U.S. PATENT DOCUMENTS

| 5,893,077 | A | 4/1999 | Griffin |
|---|---|---|---|
| 5,937,345 | A | 8/1999 | McGowan et al. |
| 6,195,543 | B1 | 2/2001 | Granberg |
| 2002/0194062 | A1 | 12/2002 | Linde |
| 2003/0212745 | A1 | 11/2003 | Caughey |
| 2003/0217139 | A1 | 11/2003 | Burbeck et al. |
| 2004/0117451 | A1 | 6/2004 | Chung |
| 2004/0255025 | A1 | 12/2004 | Ricagni |
| 2005/0014483 | A1 | 1/2005 | Lagerstrom |
| 2005/0091367 | A1* | 4/2005 | Pyhalammi et al. ......... 709/224 |
| 2005/0108340 | A1 | 5/2005 | Gleeson et al. |
| 2007/0088851 | A1 | 4/2007 | Levkovitz et al. |
| 2007/0150606 | A1 | 6/2007 | Flinchem et al. |
| 2007/0157227 | A1 | 6/2007 | Carpenter et al. |
| 2008/0279113 | A1 | 11/2008 | Kaliolla |

FOREIGN PATENT DOCUMENTS

| WO | 2002/076077 A1 | 9/2002 |
|---|---|---|
| WO | 2007/012118 A1 | 2/2007 |
| WO | 2007/014047 A1 | 2/2007 |
| WO | 2009/010636 A1 | 1/2009 |

* cited by examiner

*Primary Examiner*—Nghi H Ly
(74) *Attorney, Agent, or Firm*—Shalom Wertsberger; Saltamar Innovations

(57) ABSTRACT

A system and method for measuring media distribution and impact in a mobile communication network wherein media content is associated with messages being forwarded in the network. Media content distribution data can be measured and collected by tagging the media content at or near its point of origin and by tracking the tagged media at various points in the network during specific message related events. The collected data is stored and analyzed to determine the effectiveness and impact of media distribution in the mobile communication network.

2 Claims, 3 Drawing Sheets

MEASURING MEDIA DISTRIBUTION AND IMPACT IN A MOBILE COMMUNICATION NETWORK

CROSS-REFERENCE TO RELATED APPLICATIONS

This application claims priority from U.S. Provisional Patent Application Ser. No. 60/772,526, filed Feb. 13, 2006, the entirety of which is incorporated herein by reference.

FIELD OF INVENTION

The present invention relates to the area of media distribution in a mobile communication network and more particularly to measuring the distribution and impact of media content on the mobile communication network.

BACKGROUND

Many mobile communication networks permit subscribers to receive, send and forward a variety of media content (e.g. still images, video clips, audio clips, executable code, text) in the form of files, links (e.g. Universal Resource Locaters (URL)) or data payloads embedded in or attached to messages in, for example, a short message service (SMS), a multi-media message service (MMS) or an instant message service (IM). The Internet Engineering Task Force (IETF) Request for Comment (RFC) 4288 MIME Part Four: Media Type Specifications and Registration Procedures provides an exemplary mechanism for identifying and registering exemplary media content types.

The media content can include content generated by content providers, marketing organizations, advertisers, broadcasters and other similar media content sources. In addition, the media content can be generated by subscribers (a.k.a. user generated content (UGC)) and distributed to other subscribers in peer-to-peer (P2P) communication.

The size of these media content and the extent of their distribution (e.g. receiving, downloading) and redistribution (e.g. forwarding) is very significant in comparison with the sizes and scope of distribution experiences in primarily text-based message service, such as, short message service (SMS). In many cases the media content (e.g. movie trailers, sports highlights, new music/video releases) are redistributed in a viral like pattern with one receiver forwarding the media content to multiple other receivers who in turn each do the same. The distribution of media content can also spur other activities such as, for example, the initiation of a call to purchase a ticket, or book a time slot for test driving a car Mobile communication network operators typically lack sufficient information to allow them to analyze the effectiveness of the network in delivering the media content and the impact of the media traffic on the network. Without the ability to analyze it can be difficult for the operator to ensure high quality of service to subscribers, prevent overloading and failure of the network and develop a price model that allows profitable deliver of the service.

One possible approach to measuring media distribution in a mobile communication network is to use an analog of the computer matrix collection model used in data communications networks such as the Internet. The computer matrix collection model uses 'shim's that are installed on client devices (e.g. individual personal computers). Each shim measures and tracks client activity and sends information back to a central server for processing and analysis. For use in a mobile communication network the shims would be installed on subscribers mobile devices (e.g. mobile phones and smart phones). The use of the computer matrix collection model can involve difficulties such as, for example, collection of data from devices roaming outside of their home networks, the perception by subscribers of shims as 'spyware', and the generation of additional mobile generated IP traffic creating excessive overloads. Further difficulties in the use of the computer matrix collection model include the development of a pervasive shim as mobile device operating systems are not standardized and the distribution of shims as control of the distribution mechanism to the mobile devices can rest with different parties (e.g. the network operators and retail merchandisers).

SUMMARY OF INVENTION

A system and method for measuring media distribution and impact in a mobile communication network wherein media content is associated with messages being forwarded in the network. Media content distribution data can be measured and collected by tagging the media content at or near its point of origin and by tracking the tagged media content at various points in the network during message related events. The collected data is stored and analyzed to determine the effectiveness and impact of media distribution in the mobile communication network.

In accordance with an exemplary embodiment there is provided a system for measuring media distribution and impact in a mobile communication network comprising: one or more tagging mechanisms for adding a tag to media content associated with a message being forwarded in the mobile communications network; one or more tracking mechanisms for collecting data when the message reaches a tracking point in the mobile communications network; a data collection server for receiving collected data from the one or more tracking mechanisms and for storing the collected data; and a data analysis server for accessing the collected data stored in the data collection server and for providing data analysis of the collected data; wherein, the results of the data analysis can be used to determine the effectiveness of and the impact on the mobile communication network in distributing the media content associated with the message.

In accordance with another exemplary embodiment there is provided a method for measuring media distribution and impact in a mobile communication network comprising the steps of: adding a tag to media content associated with a message being forwarded in the mobile communications network; collecting data when the message reaches one or more tracking points in the mobile communications network; receiving collected data from the one or more tracking points and for storing the collected data; and accessing the stored collected data and providing data analysis of the collected data; wherein, the results of the data analysis can be used to determine the effectiveness of and the impact on the mobile communication network in distributing the media content associated with the message.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
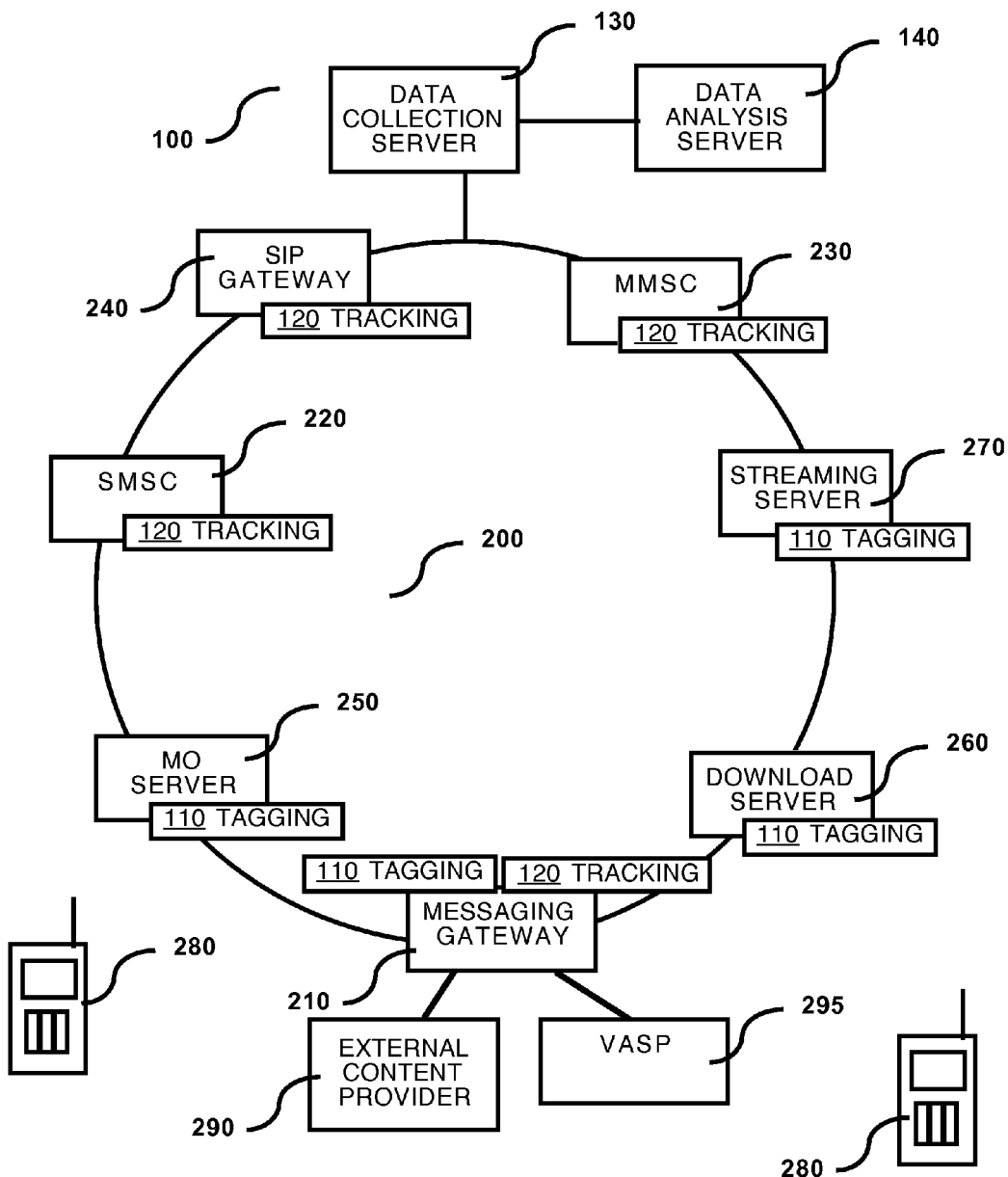
FIG. 1 is a schematic representation of an exemplary embodiment of a system for measuring media distribution and impact in a mobile communication network.

FIG. 1 is a schematic representation of an exemplary embodiment of a system 100 for measuring media distribution and impact in a mobile communication network 200. The media content is associated with messages being forwarded in the network. Media distribution metrics can be measured and collected by tagging the media content at or near its point of origin and by tracking the tagged media at various points in the network during specific message related events. The system 100 comprises one or more tagging mechanisms 110, one or more tracking mechanisms 120, a data collection server 130 and a data analysis server 140. The network 200 can, for example, comprise one or more of each of a messaging gateway 210, Short Message Service Controller (SMSC) 220, a Multimedia Message Service Controller (MMSC) 230, Session Initiation Protocol (SIP) Gateway 240, Mobile Originated (MO) Server 250, a download server 260, a streaming server 270 and other similar well known mobile communication network components. The components of the network can communicate with each other for the purpose of forwarding messages. In addition one or more mobile devices 280, external content providers 290 and Value-Added Service Providers (VASP) 295 can be connected to the network.

Tags can be added to individual instances of media content or to headers associated with the media content. For example, in text messages the tags can be added to the User Defined Header (UDH) information. The tags can be various types of distinguishable markings such as, for example, embedded watermarks, calculated messages digests and instrumented application macros that provide for the traceability and unique identification of individual instances of media content. The tags provide for the media content to be identified and tracked throughout the mobile communication network. In the case of watermarks, traceability of the message can be maintained even when the message is sent outside of the mobile communication network. Instrumented application macros are macros and code extensions that are inserted into a message where, for example, the media content is in the form of an application. When the message is opened, accepted by a mobile device 280 and/or a component of the network, or the contained application is launched a notification can be sent to the data collection server 130. The tags can include a unique identifier, a time and date stamp, a point of origin location identifier, a device identifier, a network location identifier (e.g. a cell or tower identifier, global positioning system (GPS) coordinates), an access network type (e.g. Internet protocol (IP) or circuit switched data (CSD)), message delivery type (e.g. deferred delivery (a.k.a. store and forward) or session based), a media content type identifier, a media content size, a sender address (e.g. Mobile Station International Subscriber Directory Number (MSISDN)) and a receiver address (e.g. MSISDN).

Tagging can occur at various points in the mobile communication network, preferably at points of origin such as, for example, messaging gateways 210, download servers 260 and streaming servers 270. The instrumented application macros can be inserted into an application prior to loading onto a server. In the case of user generated content (UCG) tagging can occur within a Mobile Originated (MO) gateway, MMSC 230, or other media servers within the network. Tagging mechanisms 110 for inserting the tags can be incorporated into the points of origin such as those described above.

Tracking can occur at various points in the mobile communication network such as, for example, message routers, message gateways, MMSC 230, SMSC 220, and SIP gateways 240. The tracking points can be selected based on messaging events for which media distribution metrics are desired (e.g. music downs, application downloads, message forwarding). Tracking mechanisms 120 for detecting tags and recording tag information can be incorporated into the various components of the network through which messages are processed. The tracking mechanisms 120 can identify the tagged media content and collect information about the media content, the message with which it is associated, the present message event (e.g. download or forwarding) and combinations thereof. Collected data can include any of the information contained in the tag. Collected data can also include information characterizing the message with which the media content is associated such as, for example, the address of the sender, the address of the receiver, the message type, time and date the message was sent and other similar characterizing information. The collected data can also include information about the present message event (i.e. the message processing context at the point of data collection) such as, for example, an identifier of the present message event (e.g. downloading, forwarding, replying and other similar events), the time and date, a network node identifier, an identifier for the network node from which the message was received, an identifier for the network node to which the message will be forwarded, and other similar message event information.

Figure 2:
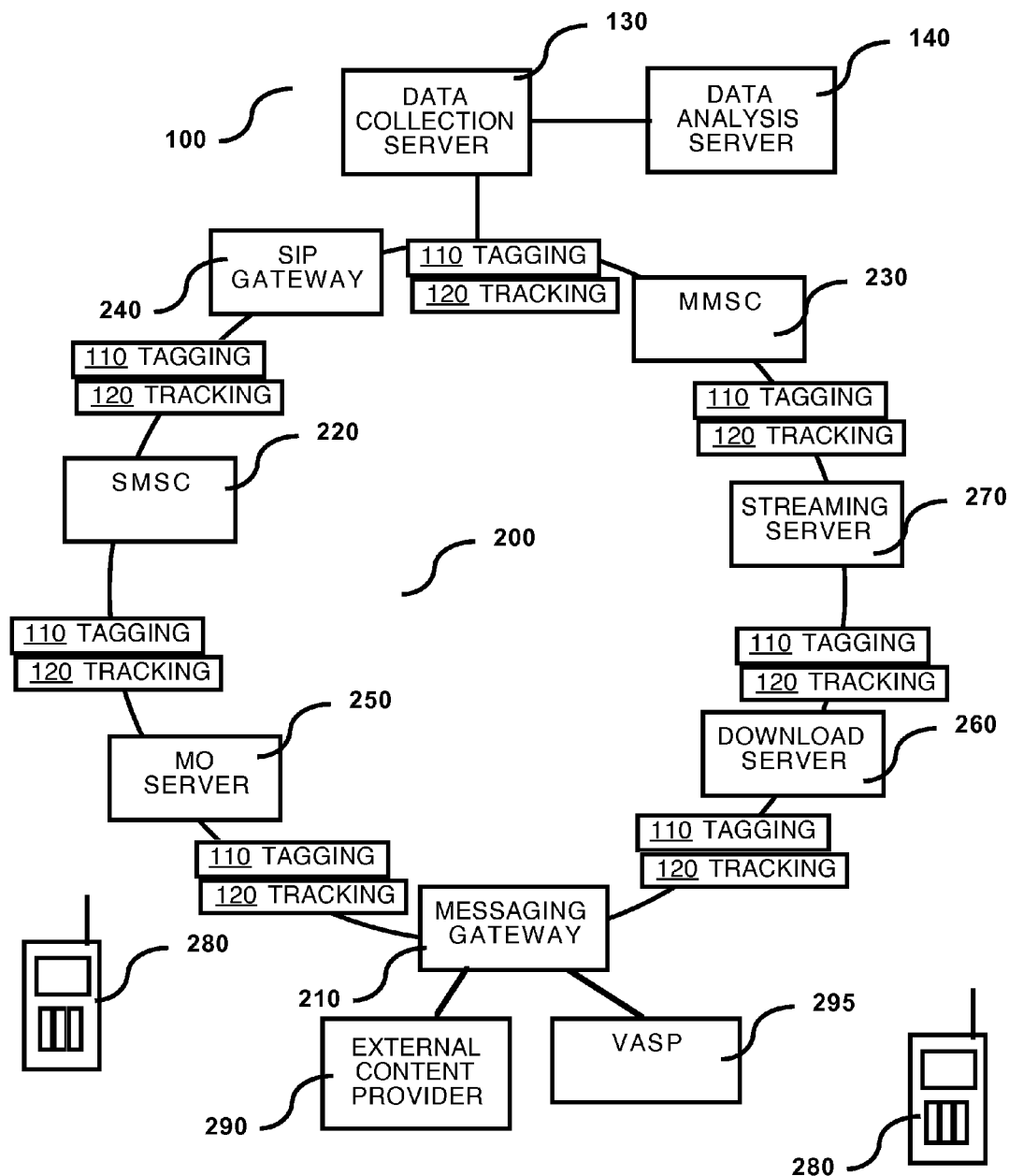
FIG. 2 is a schematic representation of an alternative exemplary embodiment of a system for measuring media distribution and impact in a mobile communication network.

FIG. 2 is a schematic representation of an alternative exemplary embodiment of a system for measuring media distribution and impact in a mobile communication network in which the tagging mechanisms 110 and tracking mechanisms 120 are not incorporated into the components of the network. Instead the tagging mechanisms 110 and tracking mechanisms 120 add tags and collect data respectively at points between the components of the network as the messages are forwarded from one network component to another. In a further alternative embodiment (not illustrated) the tagging mechanisms 110 and the tracking mechanisms 120 can be a combination of incorporated into the components of the network and at points between the components of the network.

The collected data can be sent to a media content data collection server 130. The data collection server 130 stores the collected data and provides for access to and analysis of the collected data.

A media content data analysis server 140 can access the collected data stored in the data collection server 130, generate various data analysis based on the collected data and present the results to the network operator. For example, correlations can be made between the messaging events and the media content types, between message events and call data records (CDR) and other similar correlations. When a macro tag is inserted into an application offline usage information of the application (e.g. how many times a game was played since it was downloaded) can be synchronized back to the data collection server 130 on a periodic basis for analysis. Performance indicators can be generated such as, for example, numbers of subscribers including demography and locations, times of deliver, forwarding of content, interactions with additional services and errors in delivery. Analysis of media content and message events can include viral effects, impact on network traffic and performance, errors experienced by subscribers. The results of the analysis can be used to refine services (e.g. advertising/marketing), that use media content, to improve their impact.

In an alternative exemplary embodiment, the data analysis can also use other forms of data that are generated and collected by well known systems in the operation of the mobile communication network such as, for example, call details records (CDR), automated message accounting (AMA), operational measures (OM) and other similar forms of data.

The results of the data analysis can assist the network operator in measuring the effectiveness of the media content, the effectiveness of a mobile marketing campaign, the degree of viral behavior of a new service that is launched, in providing a capability for lawful interceptions of media content, in providing parental supervision and in providing mobile based marketing. The results of the data analysis can also assist the network operator in determining the impact (e.g. traffic flows and levels) in the network in relation to the media content. The results of the data analysis can also be used by interested parties other than the network operator such as, for example, the suppliers of media content, advertisers, application providers and other similar interested parties.

Other examples of measurements of effectiveness and impact of media content distribution in the mobile communication network include:

a) determining if a message achieved SuperDistribution (i.e. viral distribution of a single media content message). In particular for messages originating external to the network from a service bureau, content provider, or ad agency;

b) correlation of mobile originated user generated content from a mobile subscriber to other mobile or non-mobile subscribers (including mobile subscribers using a softphone on a laptop);

c) correlation of a message to the download of additional information (equivalent of a click-through in Web based terms), or a teaser/headline followed by the full body of the message;

d) correlation of a message to a call-setup (e.g. the message could indicate an advertisement with a number to call for a pizza special);

e) correlation of messages to identify active senders (a.k.a. connectors) vs passive senders. Where connectors are those with wide social circles who are the "hubs" of a human social network and are responsible for the small world phenomenon Targeting a connector with a new service or message may provide a better success rate on the overall take-up usage of a service;

f) correlation of the differing media types and their effectiveness on distribution and digestion, for example, does a MPEG4 video clip correlate to increased movie usage? Would a text message have the same effect on driving traffic;

g) determination of how the media is distributed using differing messaging and delivery technologies. For example the message could come in via MMS, but is then forwarded and resent via a SMS message (parts of it are lost), or it is resent within an mobile Instant Messaging session;

h) correlation of a news or social event (e.g. sporting events, earthquakes) to the type/class and number of messages generated in a given time period following the event; and i) Correlation of messages and messages situations against geographic locations. That is, determining location based messaging behaviour (e.g. messaging pictures from the Eiffel Tower).

Figure 3:
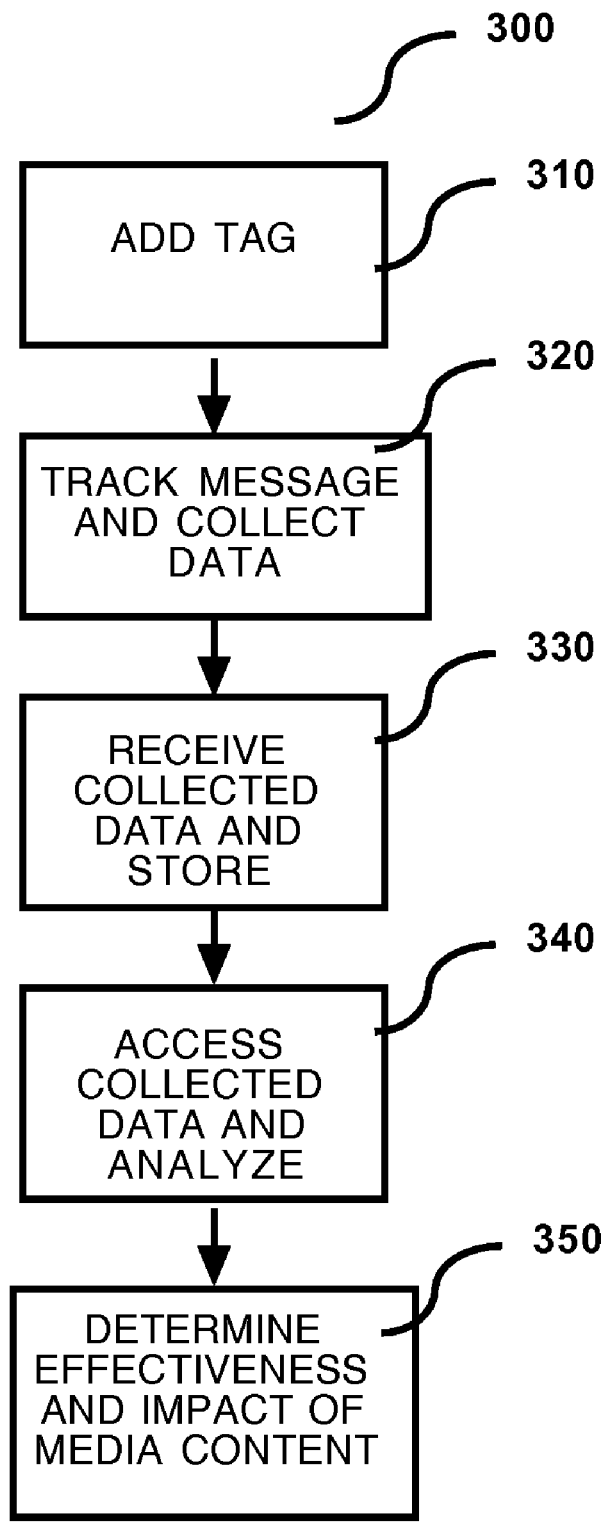
FIG. 3 is a flow diagram representing steps in an exemplary embodiment of a method for measuring media distribution and impact in a mobile communication network.

FIG. 3 is a flow diagram of the steps in an exemplary method 300 for measuring media distribution and impact in a mobile communications network. The method 300 can be implemented using the system for measuring media distribution and impact in a mobile communications network described above with reference to FIG. 1. In step 310 a tag is added to the media content associated with a message as described above. The tag can be added at a network node processing the message or at a point between nodes that are processing the message. In step 320, the message is tracked and data is collected as described above. Tracking can occur at a network node processing the message or at a point between nodes that are processing the message. Each message can be tracked one or more times at the same location or at different locations. In step 330, the collected data is sent to a media content data collection server 130 where it is received and stored. Collected data from one or more tracking points can be sent to the media content data collection server 130 and be stored. In step 340, collected data stored in the media content data collection server 130 can be accessed and analyzed as described above. In step 350, the results of the analysis of the collected data can be used to determine the effectiveness of and the impact on the mobile communication network in distributing media content.

The method according to the present invention can be implemented by a computer program product comprising computer executable program instructions stored on a computer-readable storage medium.

It will be apparent to one skilled in the art that numerous modifications and departures from the specific embodiments described herein may be made without departing from the spirit and scope of the present invention.

The invention claimed is:

1. A system for measuring media distribution and impact in a mobile communication network comprising:

one or more tagging mechanisms for adding a tag to media content associated with a message being forwarded in the mobile communications network the tag comprising a point of origin location identifier;

one or more tracking mechanisms for collecting data when the message reaches a tracking point in the mobile communications network;

a data collection server for receiving collected data from the one or more tracking mechanisms and for storing the collected data; and a data analysis server for accessing the collected data stored in the data collection server and for providing data analysis of the collected data; wherein, the results of the data analysis can be used to determine the effectiveness of and the impact on the mobile communication network in distributing the media content associated with the message.

2. A method for measuring media distribution and impact in a mobile communication network comprising the steps of:

adding a tag to media content associated with a message being forwarded in the mobile communications network, the tag comprising point of origin location identifier;

collecting data when the message reaches one or more tracking points in the mobile communications network;

receiving collected data from the one or more tracking points and for storing the collected data; and accessing the stored collected data and providing data analysis of the collected data; wherein, the results of the data analysis can be used to determine the effectiveness of and the impact on the mobile communication network in distributing the media content associated with the message.

* * * * *